E. W. HAMBURGER.
COOKING OR HEATING UTENSIL.
APPLICATION FILED NOV. 15, 1907.
914,828.
Patented Mar. 9, 1909.
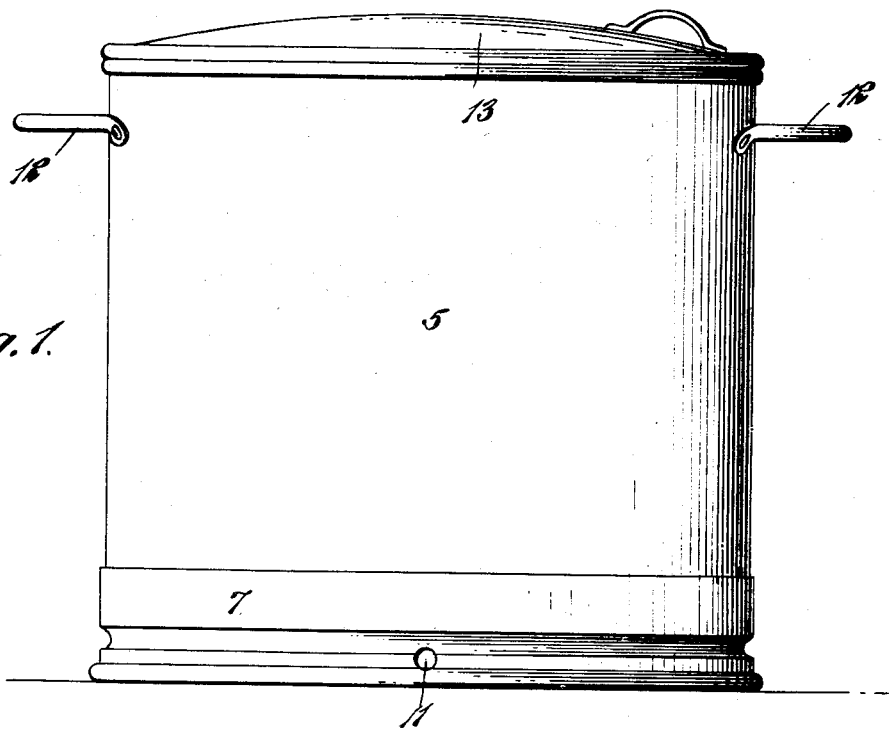
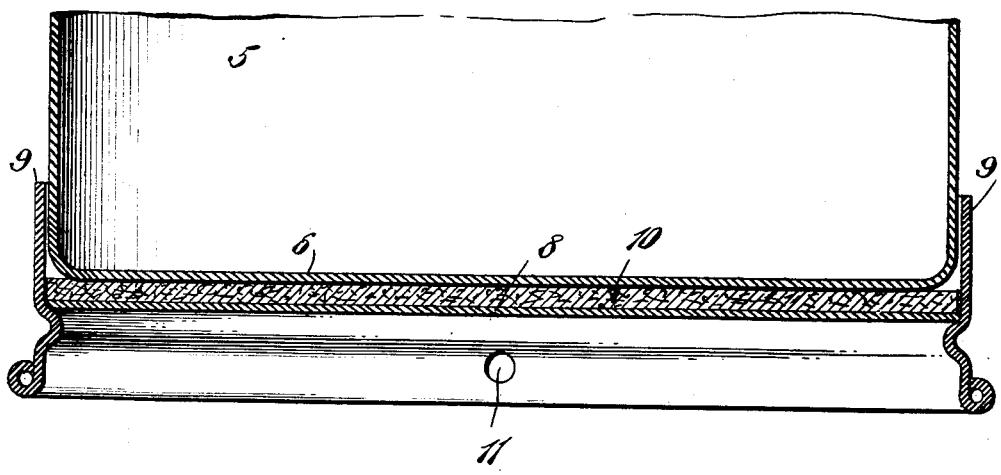
WITNESSES
INVENTOR
Ernest W. Hamburger
BY
ATTORNEY

UNITED STATES PATENT OFFICE.

ERNEST W. HAMBURGER, OF NEW YORK, N. Y., ASSIGNOR TO STRANSKY & CO., OF NEW YORK, N. Y., A CORPORATION OF NEW YORK.

COOKING OR HEATING UTENSIL.

No. 914,828.　　　Specification of Letters Patent.　　　Patented March 9, 1909.

Application filed November 15, 1907. Serial No. 402,291.

*To all whom it may concern;*

Be it known that I, ERNEST W. HAMBURGER, a citizen of the United States, residing at New York, borough of Manhattan, county and State of New York, have invented certain new and useful Improvements in Cooking or Heating Utensils, of which the follow is a specification.

This invention relates to cooking or heating utensils and has for its object the prevention of overheating, and, therefore, the sticking and scorching, of the contents of the utensil without effecting a consequent reduction of the desired or necessary temperature of such contents during the cooking or heating process.

The invention consists in the peculiar construction and combination of parts as hereinafter fully described and particularly pointed out in the claim, and will be more readily understood by reference to the accompanying drawings in which—

Figure 1 is a side elevation of a utensil embodying my invention, and Fig. 2 is an enlarged central section of the lower or bottom portion thereof.

In the drawings, numeral 5 refers to the body portion of what is known as a "stock pot," which form of utensil I have arbitrarily selected for the purpose of this description, although my invention may obviously be applied to other kinds of containers. This body portion 5, together with the bottom 6, is usually formed from a single sheet of metal, preferably sheet steel, and for sanitary and other reasons is generally coated with what is known as "enamel." This enamel is not affected by ordinary cooking temperatures, but may easily be injured or destroyed by overheating.

Separable from the container 5 is the tubular base 7 provided with an internal annular shoulder between its ends on which is supported a flat plate 8 which is continuous in one plane and with the rim 9 forms a cup within which the lower portion of the container 5 snugly fits. Upon the plate 8 I loosely place a mat 10 of insulating material, such as asbestos, extending over the entire upper surface of the plate and upon which the bottom of the container is supported. The wall of the base 7, below the plate 8, is preferably provided with ventilating apertures 11. Raising the bottom of the utensil from contact with the heat transmitting surface of the stove, particularly if the ventilating apertures are employed, prevents overheating, and interposing the mat 10 between the plate 8 and the bottom of the container insures a uniform distribution of the heat over the entire surface of the bottom.

I have found that with a utensil embodying my invention, the cooking process may be accomplished in much less time and with much more satisfactory results, and that with my invention the life of such utensil is lengthened.

I have shown the container 5 provided with handles 12 and with the usual cover 13 which, of course, form no part of the present invention.

I claim as new and desire to secure by Letters Patent:

A cooking or heating utensil comprising a separable tubular base having an internal annular shoulder intermediate the bottom and top thereof supporting a disk-shaped and imperforate metal plate, a container fitting into said base above said plate, and a removable disk of asbestic material extending over the entire surface of said plate and below the bottom of said container.

In testimony of the foregoing, I have hereunto set my hand in the presence of two witnesses.

ERNEST W. HAMBURGER.

Witnesses:
　THOMAS H. BARRON,
　EUGENE V. FEGAN.